E. D. MACKINTOSH.
LINING FOR CENTRIFUGAL MACHINES.
APPLICATION FILED JULY 19, 1918.

1,313,227.

Patented Aug. 12, 1919.

Edward D. Mackintosh
INVENTOR

UNITED STATES PATENT OFFICE.

EDWARD D. MACKINTOSH, OF BROOKLYN, NEW YORK, ASSIGNOR TO S. S. HEPWORTH COMPANY, OF NEW YORK, N. Y., A CORPORATION OF NEW YORK, AND EDITH M. MACKINTOSH, OF BROOKLYN, NEW YORK.

LINING FOR CENTRIFUGAL MACHINES.

1,313,227.   Specification of Letters Patent.   Patented Aug. 12, 1919.

Application filed July 19, 1918. Serial No. 245,786.

*To all whom it may concern:*

Be it known that I, EDWARD D. MACKINTOSH, a citizen of the United States, residing at Brooklyn, in the county of Kings and the State of New York, have invented a new and useful Improvement in Linings for Centrifugal Machines.

The object of my invention is the holding of linings in the baskets of centrifugal machines.

Referring to the accompanying drawings forming part of this specification:

Figure 1:
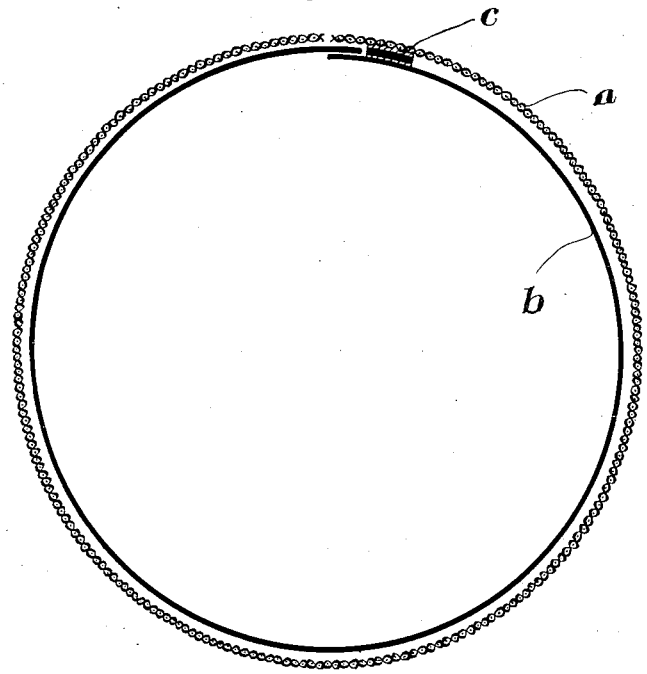
Figure 1 is a plan view.
Figure 2:
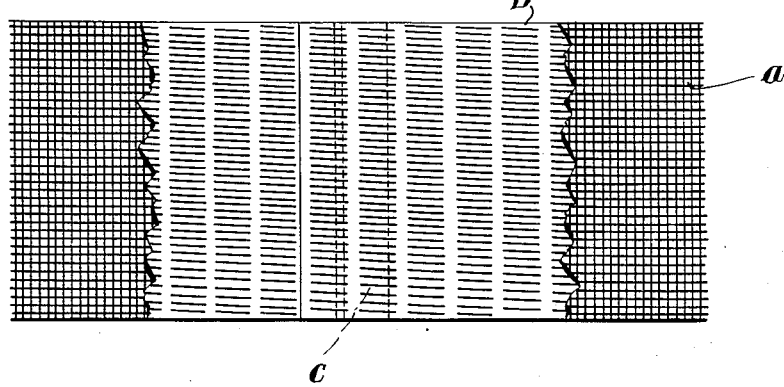
Fig. 2 is an elevation.

It is customary to use two foraminous linings within the basket of a centrifugal machine. One lies against the perforated cylindrical wall of the basket and permits the liquid which passes through it to travel along the surface of the wall to reach the perforations. The other lies against the first named and acts as a sieve. Usually the first named is in the form of a piece of coarse wire cloth, $a$, and the other is a thin perforated plate, $b$. These are not secured to each other and, unless fastened to the basket in some way, are liable to collapse.

As there are objections to fastening the linings to the basket I fasten them to each other near one end, preferably through the medium of a separating strip $c$, and I tuck the other end of the inner lining, $b$, between the two, thus accomplishing the support of the linings against collapse. The two are best fastened together by means of solder.

I claim:

1. For use in the basket of a centrifugal machine, two foraminous linings, one lying inside of and in contact with the other and the two fastened together near an end of the inner one.

2. For use in the basket of a centrifugal machine, two foraminous linings, one lying inside of and in contact with the other, the two fastened together near an end of the inner one and the opposite end of the inner one between the two.

3. For use in the basket of a centrifugal machine, two foraminous linings, one lying inside of and in contact with the other, the two fastened together near an end of the inner one, through the medium of a separating strip, and the opposite end of the inner one between the two.

EDWARD D. MACKINTOSH.